(12) United States Patent
Kim

(10) Patent No.: US 8,099,617 B2
(45) Date of Patent: Jan. 17, 2012

(54) COMPUTER APPARATUS AND POWER SUPPLY METHOD THEREOF

(75) Inventor: Dae-hyeon Kim, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 691 days.

(21) Appl. No.: 11/947,948

(22) Filed: Nov. 30, 2007

(65) Prior Publication Data

US 2008/0209237 A1    Aug. 28, 2008

(30) Foreign Application Priority Data

Feb. 23, 2007  (KR) .................. 10-2007-0018610

(51) Int. Cl.
  *G06F 1/30* (2006.01)
(52) U.S. Cl. ........................ 713/340; 713/300
(58) Field of Classification Search ........... 713/300–340
  See application file for complete search history.

(56) References Cited

U.S. PATENT DOCUMENTS

| | | | | |
|---|---|---|---|---|
| 6,143,975 A * | 11/2000 | Liao et al. | ..................... | 136/201 |
| 6,538,344 B1 * | 3/2003 | Yang et al. | ..................... | 307/66 |
| 2005/0121064 A1 * | 6/2005 | Seo | ................. | 136/200 |
| 2007/0056622 A1 * | 3/2007 | Leng et al. | ..................... | 136/205 |

FOREIGN PATENT DOCUMENTS

| | | |
|---|---|---|
| CN | 1912800 A | 2/2007 |
| JP | 2003-189647 | 7/2003 |
| KR | 1995-5119 | 1/1995 |
| KR | 20-136864 | 8/1997 |
| KR | 2000-1545 | 1/2000 |

OTHER PUBLICATIONS

Chinese Office Action issued Dec. 21, 2010 in CN Application 200810001149.6.

* cited by examiner

*Primary Examiner* — Dennis M Butler
(74) *Attorney, Agent, or Firm* — Stanzione & Kim, LLP

(57) ABSTRACT

A computer apparatus includes an information processing unit that processes information, a storing unit having a storage space in which the information being processed is stored, a main power supply that supplies power to the information processing unit, an auxiliary power supply including a thermoelectric element that converts heat generated in the computer into auxiliary power, and a controller that controls the auxiliary power supply to supply the auxiliary power to the information processing unit and the storing unit if it is determined that supply of power from the main power supply is interrupted, and controls the information processing unit to store the information to be processed by the information processing unit in the storing unit.

21 Claims, 4 Drawing Sheets

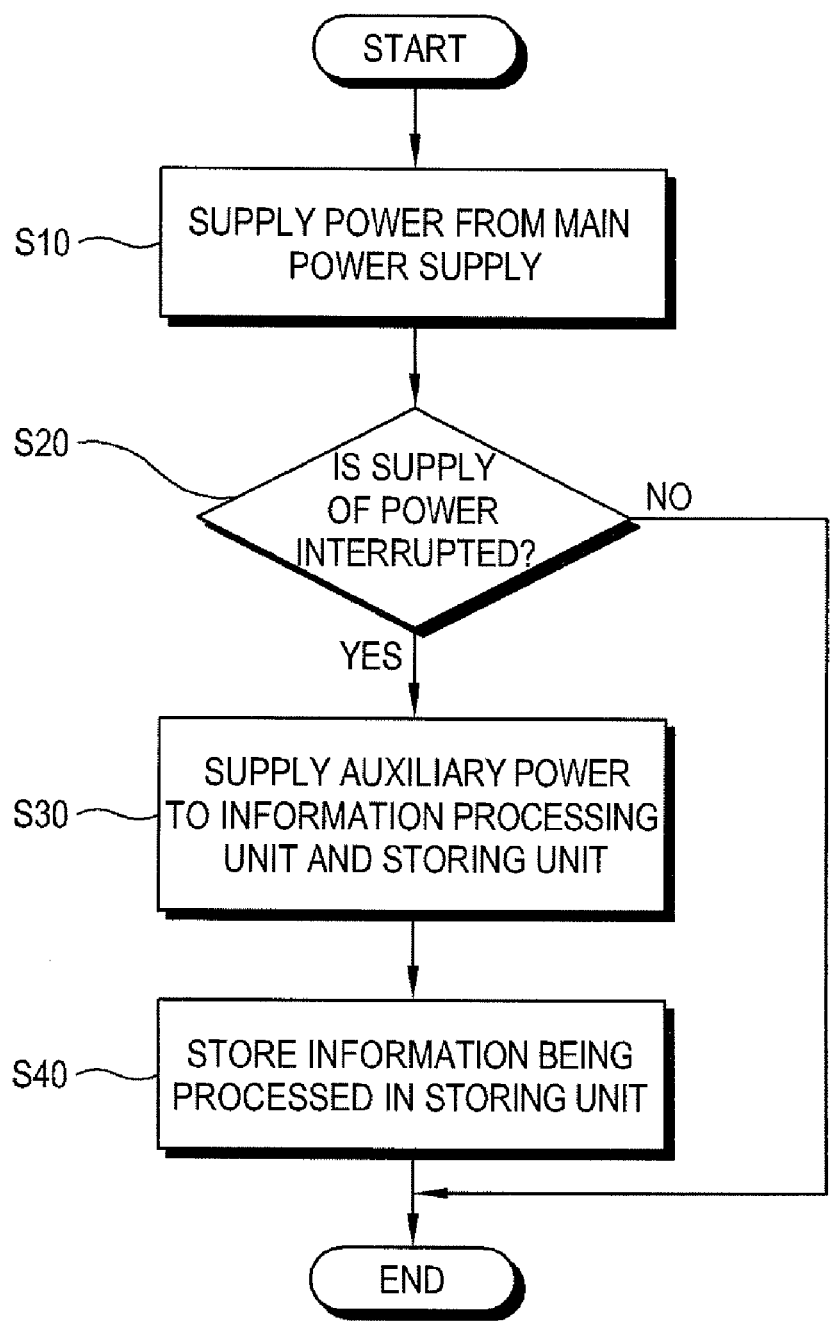

COMPUTER APPARATUS AND POWER SUPPLY METHOD THEREOF

CROSS-REFERENCE TO RELATED APPLICATIONS

This application claims priority from Korean Patent Application No. 10-2007-0018610, filed on Feb. 23, 2007 in the Korean Intellectual Property Office, the disclosure of which is incorporated herein in its entirety by reference.

BACKGROUND OF THE INVENTION

1. Field of the Invention

The present general inventive concept relates to a computer apparatus and a power supply method thereof, and more particularly, to a computer apparatus using a thermoelectric device, and a power supply method thereof.

2. Description of the Related Art

FIG. 1 is a view illustrating a conventional computer 1. Referring to FIG. 1, the conventional computer 1 includes an information processing unit 2 that processes information, a storing unit 3 in which the processed information is stored, a main power supply 4 that supplies power to the information processing unit 2, and a battery or an uninterruptible power supply (UPS) 5 that supplies auxiliary power to the information processing unit 2.

In the computer 1, the information processing unit 2 is supplied with the power from the main power supply 4, processes the information and stores the processed information in the storing unit 3. The main power supply 4 includes a typical commercial AC power source. If commercial AC power is not applied to the computer 1, the computer may be supplied with the auxiliary power from the battery of the battery 5. If abnormality such as momentary power failure or transient voltage occurs in the computer 1, the computer 1 may be supplied with stable power from the UPS of the battery 5.

However, if the computer 1 is equipped with the battery or the UPS for carrying or preparing against the abnormality, it becomes difficult to miniaturize the computer 1 or reduce product costs of the computer 1. In addition, in a computer having no battery or UPS, such as a non-battery computer system, there is a need to prevent the processed information from being lost even if abnormality occurs in the computer.

SUMMARY OF THE INVENTION

The present general inventive concept provides a computer apparatus and a power supply method, which are capable of preventing information from being lost without an auxiliary power supply by converting heat generated in processing the information into electrical energy and storing the information using the electrical energy.

The present general inventive concept also provides a computer apparatus and a power supply method, which are capable of increasing a power use efficiency by reusing heat generated in processing information as electrical energy.

Additional aspects of the present general inventive concept will be set forth in part in the description which follows and, in part, will be obvious from the description, or may be learned by practice of the present invention.

The foregoing and/or other aspects of the present general inventive concept can be achieved by providing a computer apparatus including an information processing unit that processes information, a storing unit having a storage space to store the processed information, a main power supply that supplies power to the information processing unit, an auxiliary power supply including a thermoelectric element that converts heat generated in the computer into auxiliary power, and a controller that controls the auxiliary power supply to supply the auxiliary power to the information processing unit and the storing unit if it is determined that the supply of the power from the main power supply is interrupted, and controls the information processing unit to store the processed information in the storing unit.

The computer apparatus may further include a cooling unit having a heat sink that absorbs the generated heat.

The cooling unit may include a fan that discharges the generated heat, and the controller may control an operation of the fan to stop discharging if it is determined that the supply of power from the main power supply is interrupted.

The controller is changed to a power save mode if it is determined that the supply of power from the main power supply is interrupted.

The main power supply may include at least one of an adaptor to which an external power is applied and a battery to which the auxiliary power is applied.

The information processing unit may include a basic input/output system (BIOS) and an input/output controller hub (ICH) that receive a signal corresponding to the interruption of the supply of power, and a central processing unit (CPU) that stores the information being processed in the storing unit based on the received signal.

The foregoing and/or other aspects of the present general inventive concept can also be achieved by providing a power supply method of a computer apparatus which includes an information processing unit that processes information, a storing unit having a storage space in which the information being processed is stored, a main power supply that supplies power to the information processing unit, and an auxiliary power supply including a thermoelectric element that converts heat generated in the computer into auxiliary power, the power supply method including determining whether supply of power from the main power supply is interrupted, supplying power from the auxiliary power to the information processing unit and the storing unit if it is determined that the supply of power from the main power supply is interrupted, and storing the information being processed by the information processing unit in the storing unit.

The computer apparatus may further include a cooling unit having a heat sink that absorbs the generated heat, and wherein the supplying the auxiliary power includes cooling the computer by means of the heat sink.

The cooling unit may include a fan, the cooling the computer may include cooling the computer using the fan, and the storing of the information may include stopping an operation of the fan if it is determined that the supply of power from the main power supply is interrupted.

The power supply method may further include changing the computer into a power save mode if it is determined that the supply of power from the main power supply is interrupted.

The supplying of the power may include supplying the power through at least one of an adaptor to which external power is applied and a battery to which the auxiliary power is applied.

The storing of the information may include receiving a signal corresponding to the interruption of the supply of power by means of a basic input/output system (BIOS) and an input/output controller hub (ICH), and storing the information being processed by means of a central processing unit (CPU) based on the received signal.

The foregoing and/or other aspects of the present general inventive concept can also be achieved by providing computer apparatus including an information processing unit to process information, a storing unit to store the information, an auxiliary power supply comprising a thermoelectric element to convert heat into an auxiliary power, and to supply the auxiliary power to the information processing unit to store the information in the storing unit.

The computer apparatus may further include a main power supply to supply a main power to the information processing unit, and a controller to control the auxiliary power to be supplied to the information processing unit to store the information in the storing unit according to a state of the main power supply.

The main power may be an externally generated power, and the auxiliary power may be an internally generated power.

The computer apparatus may further include a main power supply to supply a main power to the information processing unit, and the information processing unit may generate the heat according to the main power supplied from the information processing unit to convert the heat into the auxiliary power to be supplied to the information processing unit.

The computer apparatus may further include a main power supply to supply a main power to the information processing unit, and the controller may control the auxiliary power supply to supply the auxiliary power to the information processing unit and the storing unit according to a state of the main power supply.

The computer apparatus may further include a main power supply to supply a main power to the information processing unit, and a controller to selectively control the main power supply and the auxiliary power supply to selectively supply one of the main power and the auxiliary power to the information processing unit and the storing unit according to a state of the main power supply and the auxiliary power supply.

The information processing unit may generate the heat, and the auxiliary power supply may be disposed to receive the heat from the information processing unit and to convert the heat into the auxiliary power.

The computer apparatus may further include an element to generate a second heat, and the auxiliary power supply may be disposed between the element and the information processing unit to receive the heat and the second heat and to convert the heat and the second heat into the auxiliary power.

The computer apparatus may further include a cooling unit to discharge the heat when the thermoelectric element does not convert the heat into the auxiliary power.

The computer apparatus may further include a main power supply to supply a main power to the information processing unit; a cooling unit to discharge the heat when the main power supply supplies the main power to the information processing unit.

The computer apparatus may further include a main power supply to supply a main power to the information processing unit, a cooling unit to discharge the heat in a discharging operation and stop discharging the heat in a non-discharging operation, and a controller to control the cooling unit to perform one of the discharging operation and the non-discharging operation according to a state of the main power supply.

The foregoing and/or other aspects of the present general inventive concept can also be achieved by providing a method of supplying a power in a computer apparatus, the method including processing information in an information processing unit; and converting heat into an auxiliary power using a thermoelectric element to supply the auxiliary power to the information processing unit to store the information in a storing unit.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 4 is a flow chart illustrating a power supply method of a computer apparatus according to an exemplary embodiment of the present general inventive concept.

DETAILED DESCRIPTION OF THE PREFERRED EMBODIMENTS

Figure 1:
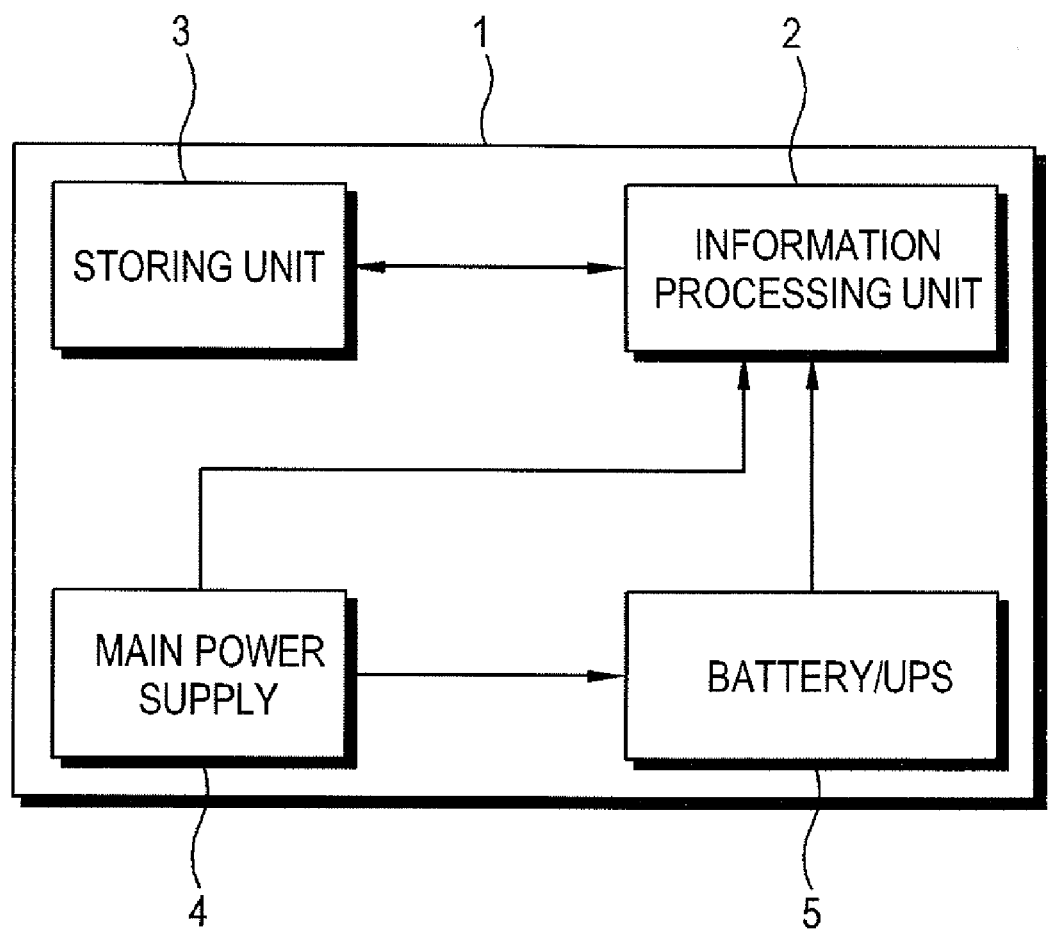
FIG. 1 is a block diagram illustrating a conventional computer.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Hereinafter, a computer apparatus 100 according to an exemplary embodiment of the present general inventive concept is explained referring to appended figures.

Figure 2:
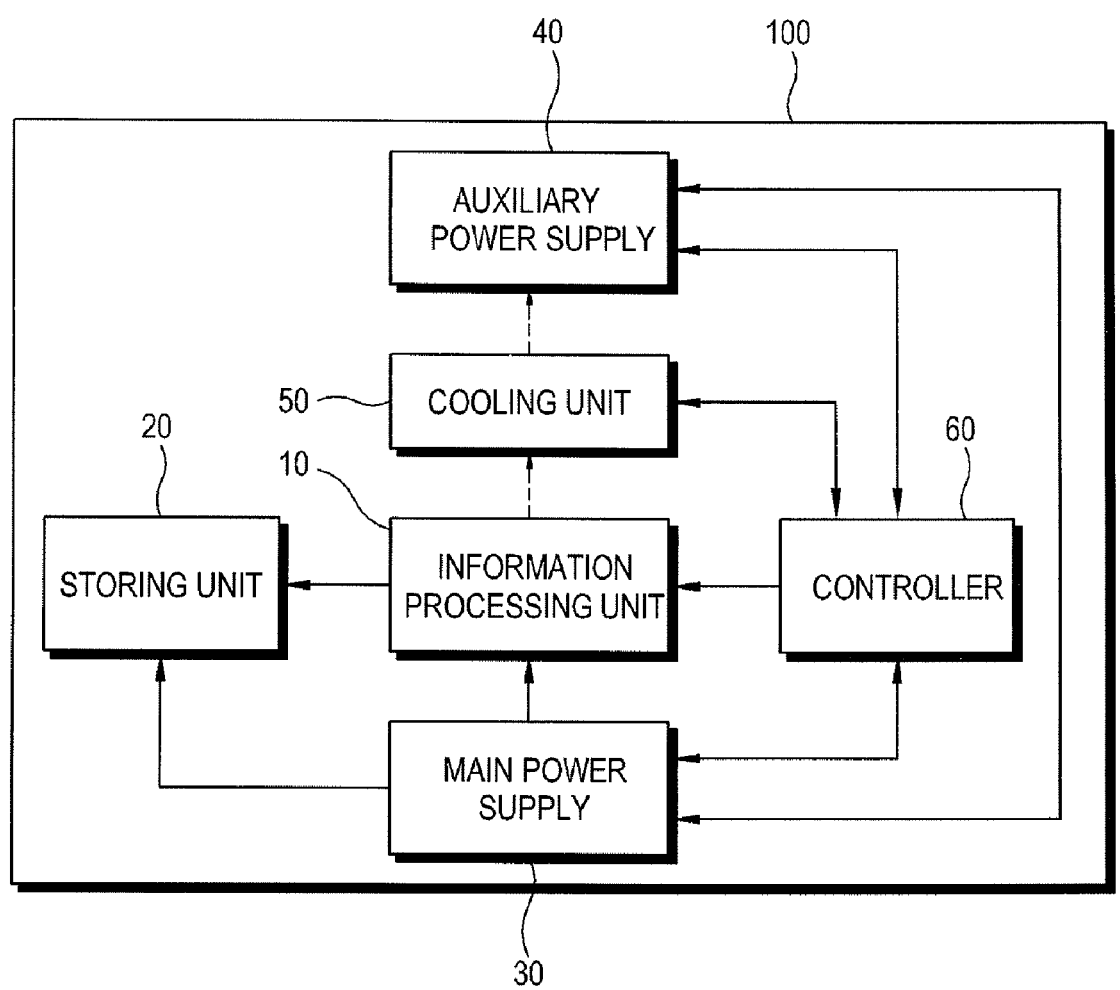
FIG. 2 is a block diagram illustrating a computer apparatus according to an exemplary embodiment of the present general inventive concept.
Figure 3:
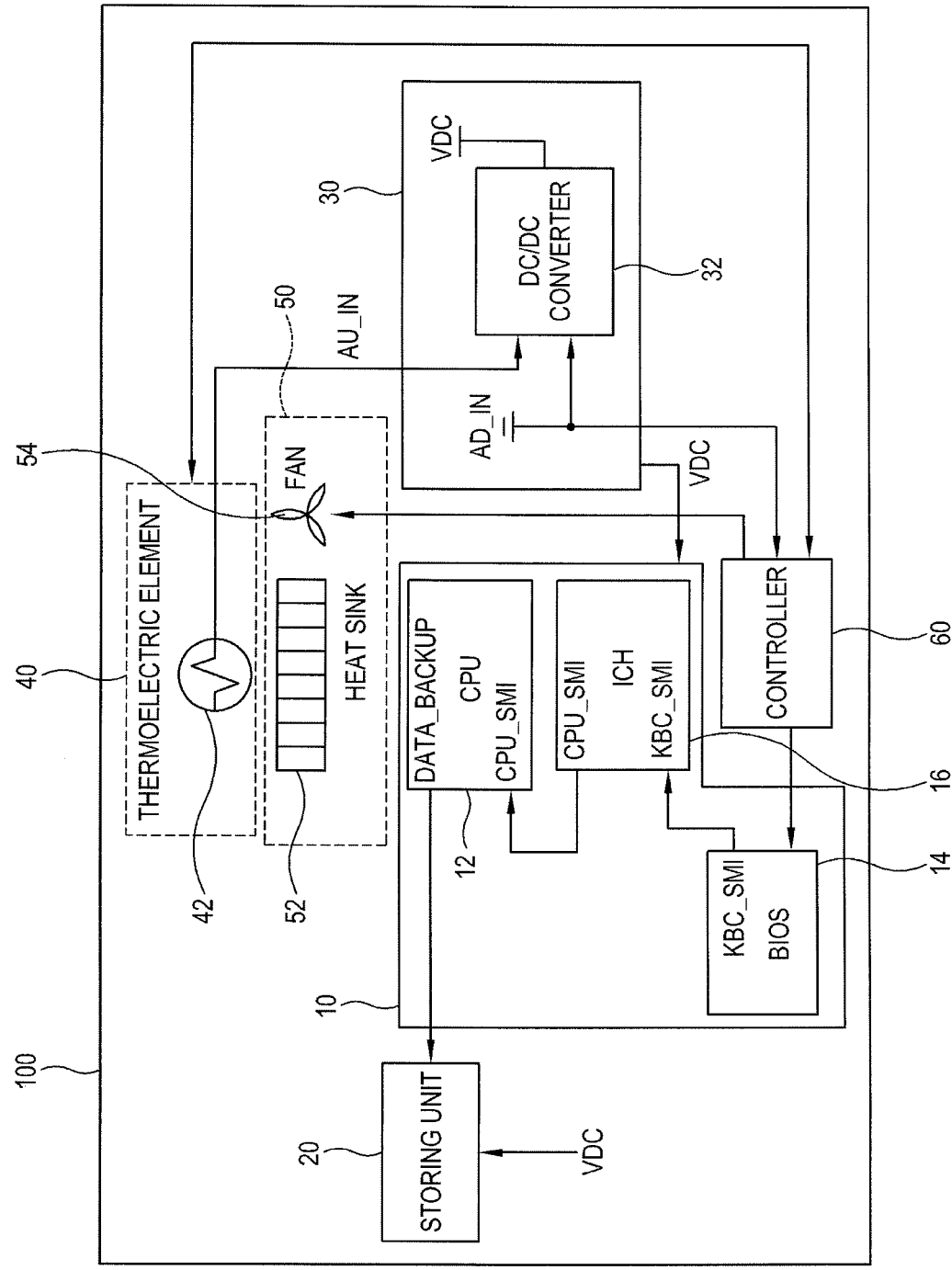
FIG. 3 is a detailed circuit diagram illustrating a computer apparatus according to an exemplary embodiment of the present general inventive concept.

FIG. 2 is a block diagram illustrating the computer apparatus 100 according to the exemplary embodiment of the present general inventive concept, and FIG. 3 is a detailed circuit diagram of the computer apparatus 100 of FIG. 2. As illustrated in FIG. 2, the computer apparatus 100 includes an information processing unit 10, a storing unit 20, a main power supply 30, an auxiliary power supply 40 and a controller 60.

The computer apparatus 100 may have a housing as a main body, and the information processing unit 10, the storing unit 20, the main power supply 30, and the auxiliary power supply 40 may be disposed or installed in the housing. It is possible that all of the information processing unit 10, the storing unit 20, the main power supply 30, the auxiliary power supply 40, and the controller 50 are disposed or mounted in the housing as illustrated in FIG. 3. It is possible that the storing unit 20 may be installed in an outside of the housing to be connected to the information processing unit 10 to store the information.

Referring to FIGS. 2 and 3, the information processing unit 10 processes information inputted thereto. In this exemplary embodiment, the information processing unit 10 may include a central processing unit (CPU) 12 that processes the information inputted thereto, a basic input/output system (BIOS) 14 that stores information required to drive a plurality of electronic components included in the computer apparatus 100, and an input/output controller hub (ICH) 16 that controls operations related to input/output of the computer apparatus 100, and may process the information using a predetermined application program.

The storing unit 20 stores the information processed by the information processing unit 10 and has a storing space to store the information to be processed by the information processing unit 10. In this exemplary embodiment, the storing unit 20 may be embodied by a hard disk, a flash memory as a non-volatile memory, or conventional storage devices and may be detachably installed in the computer apparatus 100 through a predetermined interface connected therebetween to form a wired or wireless connection.

The main power supply 30 supplies power to the information processing unit 10. In this exemplary embodiment, the main power supply 30 may include an adaptor to receive an external power and output a power AD_IN, and a battery to receive an auxiliary power from the auxiliary power supply 40 and output a power AU_IN. If the computer 100 is a non-battery system, the main power supply 30 does not include the battery but includes the adaptor.

When the computer apparatus 100 is a battery system, the battery illustrated as a dotted line is included in the main power system to store the auxiliary power. When the computer apparatus 100 is the non-battery system, the battery illustrated as the dotted line is not included in the main power supply 30. Accordingly, at least one of the powers AD_IN and AU_IN is selectively supplied to the controller and/or the information processing unit 10, and the storing unit 20 according to a state of the external power and/or a state of the auxiliary power supply 40.

In addition, the main power supply 30 may further include a DC/DC converter 32 that converts power supplied from the auxiliary power supply 40 into a voltage VDC of a level required to drive the plurality of electronic components included in the computer apparatus 100.

In a case where the computer apparatus 100 is embodied by a portable computer, the DC/DC converter 32 may include a switching voltage regulator that outputs various voltage levels required to drive the electronic components, for example, ±5 V, ±3.3 V, ±2.5 V and the like if an auxiliary power of about 9 V is inputted from the auxiliary power supply 40.

Here, the power AD_IN can be supplied to the DC/DC converter 32 to output the voltage VDC having the various voltage levels required to drive the electronic components, for example, ±5 V, ±3.3 V, ±2.5 V and the like. The DC/DC converter 32 may selectively convert the power AD_IN or AU_IN into the voltage VDC. It is also possible that the power AD_IN or AU_IN can be directly supplied to the components and/or the controller and/or the information processing unit 10, and the storing unit 20 when the power AD_IN or AU_IN is suitable to drive for the electronic components or corresponds to the voltage VDC having the various voltage levels.

When the computer apparatus 100 is the battery system, an output power of the battery can be supplied to the DC/DC converter 32 to convert the output power into the voltage VDC. The converted voltage VDC can be supplied to the components or the controller and/or the information processing unit 10, and the storing unit 20 according to the state of at least one of the external power and the auxiliary power supply 40. It is possible that the output power can be directly supplied to the components and/or the controller and/or the information processing unit 10, and the storing unit 20 when the power AD_IN or AU_IN is suitable to drive for the electronic components or corresponds to the voltage VDC having the various voltage levels.

The auxiliary power supply 40 includes a thermoelectric device 42 that converts heat generated in the computer apparatus 100 into electrical power to be supplied as an auxiliary power to the storing unit 20 and the information processing unit 10. The thermoelectric device 42 generates a thermoelectromotive force when a temperature difference occurs in a junction semiconductor of two different semiconductors. The thermoelectric device 42 is constituted by a series circuit in which a p type semiconductor element and an n type semiconductor element are connected to metal electrodes and uses the Peltier effect to absorb heat when a current flows from the metal electrodes through the semiconductor elements.

Specifically, when a current flows from the p type semiconductor element to the n type semiconductor element with positive(+) and negative(−) polarities at opposite ends of the metal electrodes connected to the p type semiconductor element and the n type semiconductor element respectively, holes in the p type semiconductor element move to the electrode of negative(−) polarity while electrons in the n type semiconductor element move to the electrode of positive(+) polarity. At this time, the holes and the electrons move with heat from a p-n junction electrode at an upper portion to both end electrodes at a lower portion, and accordingly, the p-n junction is cooled and absorbs the heat while the both end electrodes eject or discharge the heat.

In addition, the thermoelectric device 42 generates an electromotive force using the ejected heat and uses the Seeback effect to generate an electromotive force when a temperature difference between junctions of two different semiconductors occurs. Specifically, when an upper one of junctions between a p type semiconductor element and an n type semiconductor element is heated, thereby generating a temperature difference between the upper junction and a lower junction, electrons in the n type semiconductor element and holes in the p type semiconductor element receive heat energy. Accordingly, the electrons and the holes are increased in their total energy and thus move to a lower temperature side. Accordingly, in the n type semiconductor element, the lower temperature side into which the electrons are introduced from the n type semiconductor element is negatively charged and a higher temperature side is positively charged. Conversely, in the p type semiconductor element, the lower temperature side into which the holes are introduced from the p type semiconductor element is positively charged and the higher temperature side is negatively charged. The auxiliary power supply 40 may supply the power to the storing unit 20 and the information processing unit 10 using the electromotive force generated from the potential difference. Of course, if the main power supply 30 includes a battery, the auxiliary power supply 40 may supply power to the battery.

It is possible that the auxiliary power can be directly supplied to the components, the controller, the information processing unit 10, and/or the storing unit 20 when the auxiliary power of the auxiliary power supply 40 AU-IN is suitable to drive for the electronic components or corresponds to the voltage VDC having the various voltage levels.

A cooling unit 50 cools the heat generated in the computer apparatus 100 and may include a heat sink 52 that absorbs the generated heat.

The heat sink 52 may contact a heat generating element such as a transistor and discharges heat generated from the heat generating element into the air. The heat sink 52 may include a plurality of fins (not shown) to increase a contact area with the air.

If the cooling unit 50 includes the heat sink 52, it is possible to increase the power supply time for the information processing unit 10 since the heat sink 52 stores the generated heat for a predetermined period of time if heat is not generated when supply of power from the main power supply 30 is interrupted.

In addition, in this exemplary embodiment, the cooling unit 50 may further include a fan 54. If the supply of power from the main power supply 30 is interrupted, the fan 54 is deactivated under control of the controller 60, and accordingly, the heat generated in the computer 100 can be conserved.

In addition, although it has been illustrated that the auxiliary power supply 40 includes the thermoelectric element 42, the thermoelectric element 42 may be included in the cooling unit 50 together with the heat sink 52 and the fan 54 in a body.

The cooling unit 50 may be disposed in the housing to selectively perform a heat discharging operation according to a state of an external power supply, i.e., the adapter, or the main power supply 30.

Upon detecting the interruption of supply of power from the main power supply 30, the controller 60 supplies the auxiliary power from the auxiliary power supply 40 to the information processing unit 10 and the storing unit 20, and controls the information processing unit 10 to store information under process in the storing unit 20. In this exemplary embodiment, the controller 50 may be embodied by a microcomputer.

The thermoelectric device 42 may be disposed adjacent to the information processing unit 10 or a component which generates heat more than other elements in the computer apparatus 100. For example, when a first component of the computer apparatus 100 generates a first heat of a first temperature, and a second component of the computer apparatus 100 generates a second heat of a second temperature, the thermoelectric device 42 may be disposed close to the first component than the second component when the first heat or the first temperature is greater than the second heat or the second temperature. It is possible that the thermoelectric device 42 may be disposed between the first component and the second component.

As described above with reference to FIGS. 2 and 3, the thermoelectric element and the controller 60 communicate with each other such that a signal or a power generated from the thermoelectric element is transmitted to the controller 60, and such that a control signal generated from the controller 60 is transmitted to the thermoelectric element to provide a power to the thermoelectric element to emit a heat in a normal state.

Hereinafter, a method of the computer apparatus 100 will be described in more detail with reference to FIGS. 2 and 3.

When the power is supplied from the main power supply 30, the heat generated in the computer 100 is converted into power by the thermoelectric element 42 included in the auxiliary power supply 40, the power is converted into a suitable voltage by the DC/DC converter 32, and the controller 60 receives a signal corresponding to the voltage.

In addition, the controller 60 determines whether or not the supply of power from the main power supply 30 is interrupted. If it is determined that the power supply is interrupted, the controller 60 generates an event with a system management interrupt (SMI) signal and transmits the generated event to the BIOS 14. If the controller 60 applies the SMI signal to the BIOS 14, the BIOS 14 transmits the SMI signal to the ICH 16, and then the ICH 16 transmits the received SMI signal to the CPU 12. Upon receiving the SMI signal, the CPU 12 stores the information in the storing unit 20.

At this time, if the supply of power from the main power supply 30 is interrupted, the controller 60 may transmit a signal, which causes the computer 100 to enter a power save mode, to the information processing unit 10, and stores the information, which is currently being processed, in the storing unit 20. If supplying from the power supply is resumed, the controller 60 may restore the information process.

On the other hand, if the supply of power from the main power supply 30 is interrupted, the controller 60 may interrupt the operation of the fan 54 while storing the information in the storing unit 20.

Hereinafter, a power supply method of the computer 100 according to the exemplary embodiment of the present invention will be described with reference to FIG. 4.

First, the controller 60 controls the main power supply 30 to supply power to the information processing unit 10 at operation S10. At this time, the controller 60 may further control the heat sink 52 and the fan 54 included in the cooling unit 50 to cool the computer 100. In addition, the operation S10 may further include causing the DC/DC converter 32 to convert a level of input power into a suitable voltage, and the controller 60 may control the DC/DC converter 32 to supply the voltage to the information processing unit 10.

Next, the controller 60 determines whether or not the power supplied from the main power supply 30 in the operation S10 is interrupted at operation S20. Next, if it is determined in the operation S20 that the supply of power from the main power supply 30 is interrupted, the auxiliary power is supplied to the information processing unit 10 and the storing unit 20 at operation S30. Next, the controller 60 stores the information being processed by the information processing unit 10 in the storing unit 20 at operation S40.

On the other hand, if it is determined in the operation S20 that the supply of power from the main power supply 30 is interrupted, the controller 60 may further perform an operation of turning the computer 100 into a power saving mode.

As apparent from the above description, the present general inventive concept provides a computer and a power supply method, which are capable of preventing information from being lost without an auxiliary power supply by converting heat generated in processing the information into electrical energy and storing the information using the electrical energy.

In addition, the present invention provides a computer apparatus and a power supply method, which are capable of increasing a power use efficiency by reusing heat generated during processing information as electrical energy.

Although a few embodiments of the present general inventive concept have been shown and described, it will be appreciated by those skilled in the art that changes may be made in these embodiments without departing from the principles and spirit of the present general inventive concept, the scope of which is defined in the appended claims and their equivalents.

What is claimed is:

1. A computer apparatus comprising:
   an information processing unit that processes information;
   a storing unit having a storage space in which the information being processed is stored;
   a main power supply that supplies power to the information processing unit;
   a thermoelectric element that converts generated heat into an auxiliary power; and
   a controller that controls the thermoelectric element to supply the auxiliary power to the information processing unit and the storing unit if it is determined that supply of power from the main power supply is interrupted, and controls the information processing unit to store the information being processed by the information processing unit in the storing unit,
   wherein the computer apparatus does not include a battery.

2. The computer apparatus of claim 1, wherein the cooling unit having a heat sink that absorbs the generated heat.

3. The computer apparatus of claim 2, wherein:
   the cooling unit comprises a fan that ejects the generated heat; and
   the controller controls an operation of the fan to stop if it is determined that the supply of power from the main power supply is interrupted.

4. The computer apparatus of claim 1, wherein the controller turns into a power save mode if it is determined that the supply of power from the main power supply is interrupted.

5. The computer apparatus of claim 1, wherein the main power supply comprises an adaptor to which external power is applied.

6. The computer apparatus of claim 5, wherein the information processing unit comprises:
   a basic input/output system (BIOS) and an input/output controller hub (ICH) that receive a signal corresponding to the interruption of the supply of power; and
   a central processing unit (CPU) that stores the information being processed in the storing unit based on the received signal.

7. A power supply method of a computer apparatus which comprises an information processing unit that processes information, a controller, a storing unit having a storage space in which the information being processed is stored, and a main power supply that supplies power to the information processing unit, the power supply method comprising:
   determining whether supply of power from the main power supply is interrupted;
   converting generated heat into an auxiliary power using a thermoelectric element;
   generating a command by the controller to supply the auxiliary power from the thermoelectric element to the information processing unit and the storing unit without storing the auxiliary power in a battery if it is determined that the supply of power from the main power supply is interrupted; and
   generating a command by the controller to store the information being processed by the information processing unit in the storing unit.

8. The power supply method of claim 7, wherein:
   the cooling unit includes a heat sink that absorbs the generated heat; and
   the supplying of the auxiliary power comprises cooling the computer apparatus using the heat sink.

9. The power supply method of claim 8, wherein:
   the cooling unit comprises a fan;
   the cooling of the computer apparatus comprises cooling the computer apparatus using the fan; and
   the storing of the information comprises stopping an operation of the fan if it is determined that the supply of the power from the main power supply is interrupted.

10. The power supply method of claim 7, further comprising:
    changing the computer to a power save mode if it is determined that the supply of power from the main power supply is interrupted.

11. The power supply method of claim 7, wherein the supplying of the power comprises supplying the power through an adaptor to which external power is applied.

12. The power supply method of claim 11, wherein the storing of the information comprises:
    receiving a signal corresponding to the interruption of the supply of power by means of a basic input/output system (BIOS) and an input/output controller hub (ICH); and
    storing the information being processed by means of a central processing unit (CPU) based on the received signal.

13. A computer apparatus comprising:
    an information processing unit to process information;
    a storing unit to store the information;
    a thermoelectric element to convert heat into an auxiliary power, and to supply the auxiliary power to the information processing unit to store the information in the storing unit;
    a main power supply to supply a main power to the information processing unit;
    a controller to control the information processing unit and to control the auxiliary power to be supplied to the information processing unit to store the information in the storing unit according to a state of the main power supply; and
    a cooling unit to discharge the heat in a discharging operation and stop discharging the heat in a non-discharging operation,
    wherein the controller controls the cooling unit to perform one of the discharging operation and the non-discharging operation according to a state of the main power supply, and
    wherein non-discharging of heat occurs when the main power from the main power supply to the information processing unit is interrupted,
    wherein the computer apparatus does not include a battery.

14. The computer apparatus of claim 13, wherein the main power is an externally generated power, and the auxiliary power is an internally generated power.

15. The computer apparatus of claim 13, further comprising:
    a main power supply to supply a main power to the information processing unit,
    wherein the information processing unit generates the heat according to the main power supplied from the information processing unit to convert the heat into the auxiliary power to be supplied to the information processing unit.

16. The computer apparatus of claim 13, further comprising:
    a main power supply to supply a main power to the information processing unit; and
    a controller to control the thermoelectric element to supply the auxiliary power to the information processing unit and the storing unit according to a state of the main power supply.

17. The computer apparatus of claim 13, further comprising:
    a main power supply to supply a main power to the information processing unit; and
    a controller to selectively control the main power supply and the thermoelectric element to selectively supply one of the main power and the auxiliary power to the information processing unit and the storing unit according to a state of the main power supply and the auxiliary power supply.

18. The computer apparatus of claim 13, wherein:
    the information processing unit generates the heat; and
    the thermoelectric element is disposed to receive the heat from the information processing unit and to convert the heat into the auxiliary power.

19. The computer apparatus of claim 13, further comprising:
an element to generate a second heat,
wherein the thermoelectric element is disposed between the element and the information processing unit to receive the heat and the second heat and to convert the heat and the second heat into the auxiliary power.

20. The computer apparatus of claim 13, further comprising:
a cooling unit to discharge the heat when the thermoelectric element does not convert the heat into the auxiliary power.

21. The computer apparatus of claim 13, further comprising:
a main power supply to supply a main power to the information processing unit;
a cooling unit to discharge the heat when the main power supply supplies the main power to the information processing unit.

* * * * *